(12) United States Patent
Anderson et al.

(10) Patent No.: US 8,683,478 B2
(45) Date of Patent: Mar. 25, 2014

(54) BEST FIT MAPPING OF SELF-VIRTUALIZING INPUT/OUTPUT DEVICE VIRTUAL FUNCTIONS FOR MOBILE LOGICAL PARTITIONS

(75) Inventors: Gary D. Anderson, Austin, TX (US); Ping Chen, Austin, TX (US); Charles S. Graham, Rochester, MN (US); Patricia Y. Wang, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 719 days.

(21) Appl. No.: 12/974,490

(22) Filed: Dec. 21, 2010

(65) Prior Publication Data

US 2012/0159481 A1    Jun. 21, 2012

(51) Int. Cl.
*G06F 9/46* (2006.01)

(52) U.S. Cl.
USPC .......................................... 718/104; 718/105

(58) Field of Classification Search
None
See application file for complete search history.

(56) References Cited

U.S. PATENT DOCUMENTS

| | | | |
|---|---|---|---|
| 7,849,168 B2 * | 12/2010 | Utsunomiya et al. | 709/221 |
| 8,027,354 B1 * | 9/2011 | Portolani et al. | 370/431 |
| 2009/0037941 A1 | 2/2009 | Armstrong et al. | |
| 2009/0248937 A1 | 10/2009 | Solomon et al. | |
| 2009/0276773 A1 | 11/2009 | Brown et al. | |
| 2009/0313391 A1 | 12/2009 | Watanabe et al. | |
| 2010/0014526 A1 | 1/2010 | Chavan et al. | |
| 2010/0082874 A1 | 4/2010 | Baba et al. | |
| 2010/0095310 A1 | 4/2010 | Oshins et al. | |
| 2010/0180274 A1 | 7/2010 | Cherian et al. | |

* cited by examiner

*Primary Examiner* — MengYao Zhe
*Assistant Examiner* — Wissam Rashid
(74) *Attorney, Agent, or Firm* — Wood, Herron & Evans, LLP

(57) ABSTRACT

A virtual function mapping process, which is capable of being used in connection with the migration of a logical partition to a target system, creates candidate lists for virtual functions assigned to the logical partition, which are populated with candidate physical ports from a target system that are capable of being mapped to such virtual functions. Candidate physical ports are assigned weights based upon their suitability to be mapped to a particular virtual function, and as candidate physical ports are selected for virtual functions, weights for other candidate physical ports for other virtual functions are recalculated to reflect the impact of the selection of candidate physical ports on the suitability of the remaining physical ports for other virtual functions.

23 Claims, 12 Drawing Sheets

BEST FIT MAPPING OF SELF-VIRTUALIZING INPUT/OUTPUT DEVICE VIRTUAL FUNCTIONS FOR MOBILE LOGICAL PARTITIONS

FIELD OF THE INVENTION

The invention is generally related to data processing, and in particular to logically partitioned data processing systems and self-virtualizing input/output devices for use with same.

BACKGROUND OF THE INVENTION

Modern requirements for a computer system may require that a computer be utilized to run several operating environments, or operating systems, at once. In a typical embodiment, a single logically partitioned computer or data processing system can run a plurality of operating systems in a corresponding plurality of logical partitions (LPARs), also referred to as virtual machines (VMs). Each operating system resides in its own LPAR, with each LPAR allocated a part of a physical processor, an entire physical processor, or multiple physical processors from the computer. Additionally, a portion of the computer's memory is allocated to each LPAR. An underlying partition manager, often referred to as a hypervisor or virtual machine monitor (VMM), manages and controls the LPARs. The hypervisor is typically a part of the system firmware and manages the allocation of resources to the operating systems and LPARs. As such, one logically partitioned computer may run one or more LPARs and thus virtualize the operations of the applications, operating systems, and other program code configured to operate in those logical partitions.

In addition to sharing the physical processors and memory in a logically partitioned computer, LPARs also typically share other types of physical hardware resources, which are collectively referred to herein as input/output (IO) resources. For example, in order to provide LPARs with access to external networks, logically partitioned computers typically include multiple physical network adapters, e.g., network interface cards (NICs), that are shared by the LPARs, such that each LPAR is allocated at least a part of one or more physical network adapters to enable that LPAR to access various networks, e.g., local area networks, wide area networks, storage networks, the Internet, etc. Many IO resources, including many network adapters, are compliant with various Peripheral Component Interconnect (PCI) standards. PCI-compliant IO resources typically implement one or more PCI functions, e.g., to support different protocols such as Ethernet, Fibre Channel over Ethernet (FCoE), etc.

Access to IO resources in both logically partitioned and non-partitioned computers is typically handled at the operating system level through the use of device drivers. Device drivers typically provide a common interface to the operating system and the applications executing thereon to effectively hide the implementation details of a particular hardware device from these higher software layers. High level commands from these higher software layers are typically translated to device-specific commands that are appropriate for the particular make and model of the underlying IO resource. Therefore, so long as different device drivers from different vendors of a particular type of IO resource provide the same common interface to the operating system and applications, the operating system and applications can access the IO resource using the same commands and without concern for the particular make and model of the IO resource.

In many conventional logically partitioned computers, IO resources are virtualized within the hypervisor, so that conventional device drivers, appropriate for use in both logically partitioned and non-partitioned computers, may be used. Virtualization of an IO resource in a hypervisor typically requires that the hypervisor trap device accesses by the device drivers in the LPARs and effectively route the operations to the appropriate physical IO resources. Thus, where multiple LPARs share a common physical IO resource, the hypervisor itself handles the multiplexing of operations performed by the physical IO resource on behalf of each LPAR. Allocating such higher-level functionality to a hypervisor, however, has been found to introduce excessive complexity and processing overhead to the hypervisor. It is desirable in many implementations for a hypervisor to be as small, compact, fast and secure as possible so that the processing overhead of the hypervisor is minimized. As such, other technologies have been introduced in an attempt to off-load the responsibility of virtualizing IO resources from the hypervisor.

For example, in some designs, a dedicated LPAR, referred to as a virtual input/output server (VIOS), may be used to manage the virtualization of IO resources. While the use of a VIOS offloads higher-level functions from the hypervisor and reduces the overall complexity of the hypervisor, it has been found that using LPARs to provide such services to other LPARs requires relatively high overhead to instantiate and run the LPAR, and thus, a full operating system, in order to provide such services.

More recently, some designs have relied upon adjunct partitions (APs), which have also been referred to as partition adjuncts, to assist with the virtualization of IO resources. An AP is a type of partition that is more limited than a full, logical partition. An AP typically runs in a flat, static effective address space and problem state, which permits the hypervisor to apply a range of hypervisor and processor optimizations that result in a substantial decrease in system overhead associated with a context switch of the state machine from an LPAR to state data of an AP, that is, compared to a context switch of the state machine between two LPARs. In other respects, an AP is similar to a full LPAR. For example, an AP typically can be assigned resources, either physical or virtual, similar to a full LPAR. Further, an AP can be an end-point of a virtual input output (VIO) communications mechanism, similar to a full LPAR, such as VIOS.

In addition, some designs have incorporated the concept of self-virtualization of IO resources, where at least a portion of the virtualization of a physical IO resource is handled within the resource itself. The PCI single root input/output virtualization (SRIOV) specification, for example, enables a physical IO resource such as a NIC to incorporate replicated on-board functionality such as memory spaces, work queues, interrupts, and command processing so that a single function such as a single Ethernet connection can be presented to a logically partitioned computer as multiple and separate physical functions. The SRIOV specification introduces the concepts of physical functions (PFs) and virtual functions (VFs), with the former representing full PCI functions and having the ability to instantiate, configure and manage VFs, and the latter representing lightweight PCI functions with reduced configuration resources and usable by LPARs to access a self-virtualizing device.

It has been found that the use of APs in conjunction with self-virtualizing IO resources provides a flexible, efficient framework with which to virtualize IO resources in a logically partitioned computer, and does so without requiring a separate full LPAR to provide the virtualization, and without requiring such functionality to be embedded within client LPARs or in the hypervisor.

Some inefficiencies nonetheless exist in logically-partitioned computers that utilize APs to manage self-virtualizing IO resources. For example, it may be desirable to support the migration of LPARs to different physical systems. With partition migration, an LPAR running on one physical system (hereinafter referred to as a source system) can be effectively moved to a different physical system (hereinafter referred to as a target system) while maintaining the active state of the LPAR and of the operating system and applications running therein, often with a minimal interruption of service, and thus no loss of data, no loss of connectivity, and no effect on running transactions.

When an LPAR that utilizes a self-virtualizing IO resource is being migrated from a source system to a target system, it must find compatible and free virtual functions on the target system, and each physical port of any mapped target virtual function needs to have enough capacity, so the target system can assign the LPAR the same number of virtual functions and configure them the same way as the virtual functions that the LPAR is currently using on the source system. Further, when source and target systems have multiple self-virtualizing IO resources, each with multiple physical ports and associated virtual functions therefor, and where the LPAR relies on multiple virtual functions, it can be difficult to quickly and efficiently select appropriate virtual functions on the target system to be mapped to the migrating LPAR.

Therefore, a need exists in the art for a manner of mapping virtual functions to an LPAR in connection with migration of the LPAR from a source system to a target system.

SUMMARY OF THE INVENTION

The invention addresses these and other problems associated with the prior art by utilizing a virtual function mapping process that is capable of being used in connection with the migration of a logical partition to a target system, and that creates candidate lists for virtual functions assigned to the logical partition, which lists are populated with candidate physical ports from a target system that are capable of being mapped to such virtual functions. Candidate physical ports are assigned weights based upon their suitability to be mapped to a particular virtual function, and as candidate physical ports are selected for virtual functions, weights for other candidate physical ports for other virtual functions are recalculated to reflect the impact of the selection of candidate physical ports on the suitability of the remaining physical ports for other virtual functions.

Therefore, consistent with one aspect of the invention, virtual functions are mapped for a logical partition in a first logically partitioned data processing system in association with migrating the logical partition to a second logically partitioned data processing system. For each of a plurality of virtual functions assigned to the logical partition on the first logically partitioned data processing system, an associated candidate list is built for such virtual function, where each candidate list identifies at least one candidate physical port from a plurality of self-virtualizing input/output (IO) resources in the second logically partitioned data processing system that is capable of being mapped to the virtual function associated with such candidate list. A weight is calculated for each candidate physical port in each candidate list based upon suitability of such candidate physical port for mapping to the virtual function associated with such candidate list. In addition, a candidate physical port is sequentially selected for each of the plurality of virtual functions from the candidate list associated with such virtual function, and after selecting a candidate physical port for a virtual function among the plurality of virtual functions, the weight for candidate physical ports in the candidate list associated with any virtual function for which a candidate physical port has not been selected is recalculated.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a virtual function mapping process that is capable of being used in connection with the migration of a logical partition to a target system to create candidate lists for virtual functions assigned to the logical partition. The candidate lists are populated with candidate physical ports from a target system that are capable of being mapped to such virtual functions, and candidate physical ports are assigned weights based upon their suitability to be mapped to a particular virtual function. As candidate physical ports are selected for virtual functions, weights for other candidate physical ports for other virtual functions are recalculated to reflect the impact of the selection of candidate physical ports on the suitability of the remaining physical ports for other virtual functions.

Hardware and Software Environment

Figure 1:
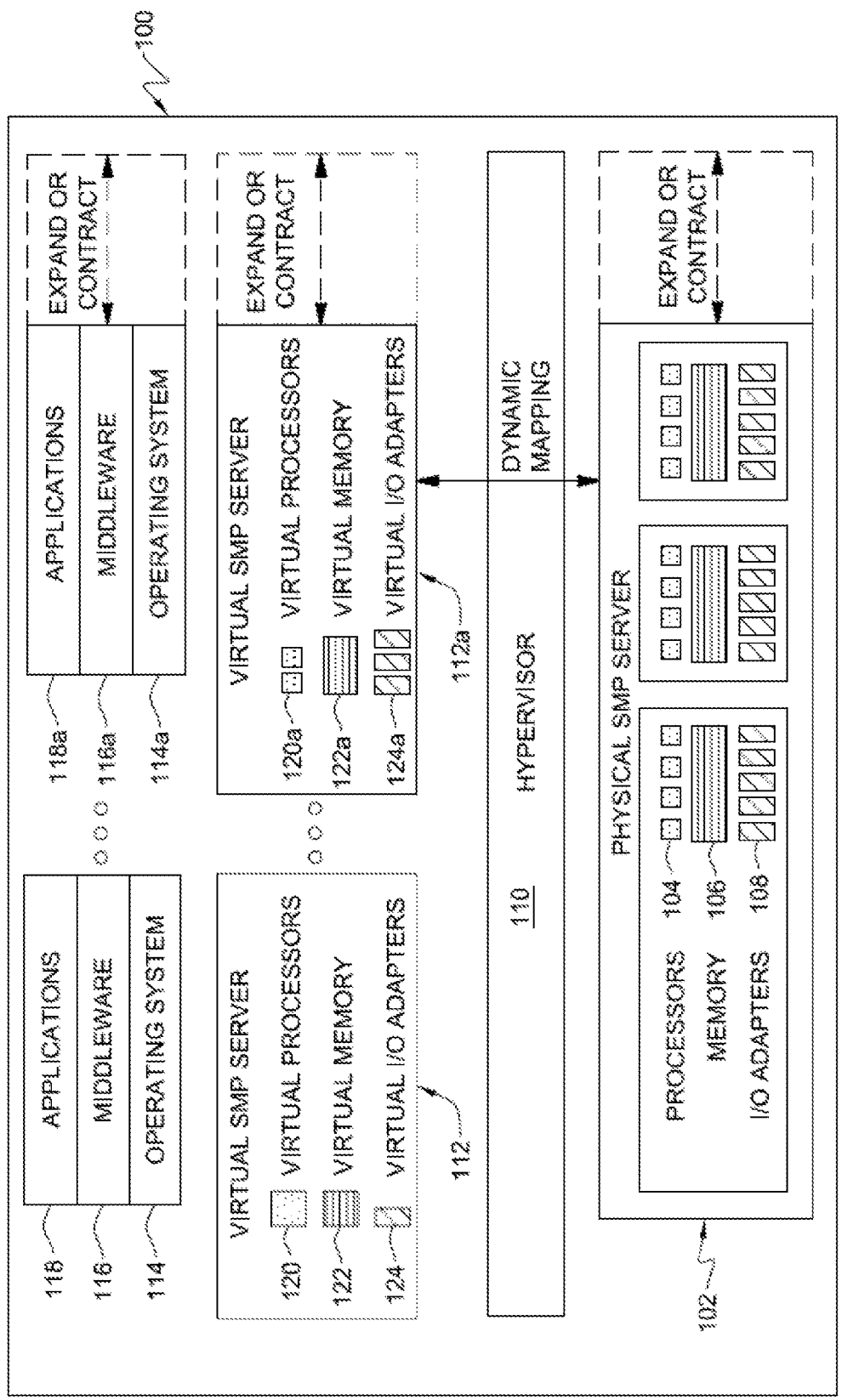
FIG. 1 is a block diagram of one embodiment of a data processing system configured to implement one or more aspects of the present invention.

Now turning to the Drawings, wherein like numbers denote like parts throughout the several views, FIG. 1 is a block diagram of a data processing system or computer 100, which in one example, is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110, which may also be referred to as a partition manager, virtual machine monitor or PHYP. Processors 104 are shared processors and each may be a simultaneous multithreading (SMT)-capable processor that is capable of concurrently executing multiple different threads on the processor.

A virtual server, or logical partition, is a proxy for a physical server that has the same capabilities, interfaces, and state. Virtual servers 112 are created and managed by a hypervisor 110 that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes virtual processors 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the virtual servers or logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
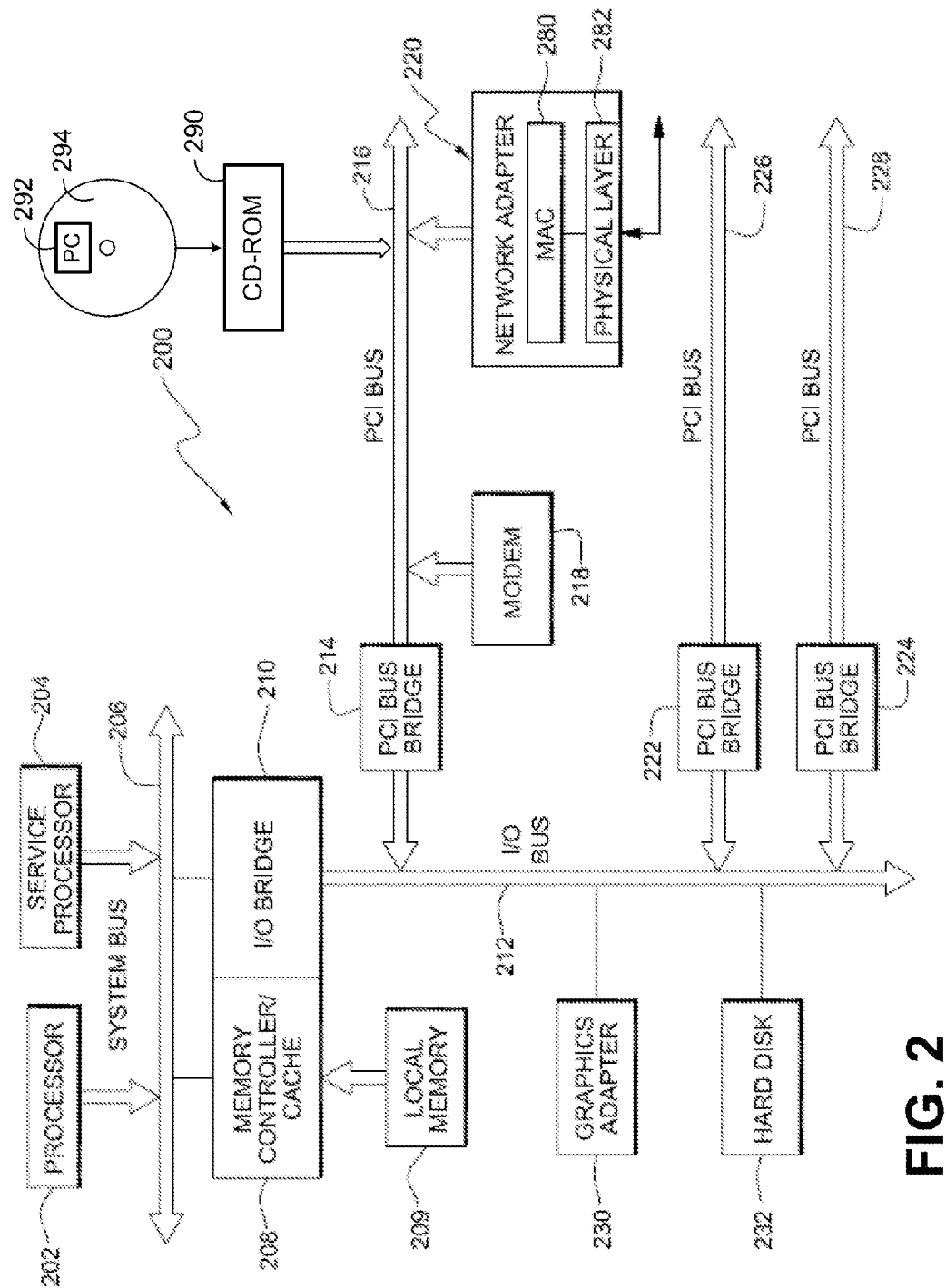
FIG. 2 is a more detailed illustration of a data processing system that may be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, the data processing system implementing an adjunct partition such as described hereinbelow can be built upon technologies found in IBM's p/i Series product line firmware and systemware, such as described in the "Power Architecture Platform Reference" (PAPR) material at Power.org (http://www.power-.org/members/developers/specs/PAPR_Version_2.2_09Oct07.pdf).

One or more aspects of the present invention can also be included in an article of manufacture (e.g., one or more computer program products) having, for instance, computer readable media. The media has therein, for instance, computer readable program code or logic (e.g., instructions, code, commands, etc.) to provide and facilitate the capabilities of the present invention. The article of manufacture can be included as a part of a computer system or sold separately. One example of an article of manufacture or a computer program product is illustrated in FIG. 2 and incorporates computer readable program code 292 stored on a computer readable medium such as an optical disk 294, and readable by an optical drive 290 coupled to data processing system 200. Additional examples of computer readable media include various physical and/or non-transitory media such as a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W) and DVD.

A sequence of program instructions or a logical assembly of one or more interrelated modules defined by computer readable program code or logic direct the performance of one or more aspects of the present invention.

Although various embodiments are described herein, these are only examples. Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one hardware-implemented processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output (I/O) devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Adjunct Partitions

Embodiments consistent with the invention utilize adjunct partitions, or partition adjuncts, which are partitions that are more limited than full, logical partitions. As described below, the adjunct partition, runs in a flat, static effective address space and problem state. These restrictions permit the hypervisor to apply a range of hypervisor and processor optimizations that result in a substantial decrease in system overhead associated with a context switch of the state machine from a logical partition to state data of an adjunct partition, that is, compared to a context switch of the state machine between logical partitions. In other respects, an adjunct partition is similar to a full logical partition. For example, an adjunct partition can be assigned resources, either physical or virtual, similar to a full logical partition. Further, an adjunct partition can be an end-point of a virtual input output (VIO) communications mechanism, similar to a full logical partition, such as a virtual input output server (VIOS).

Figure 3:
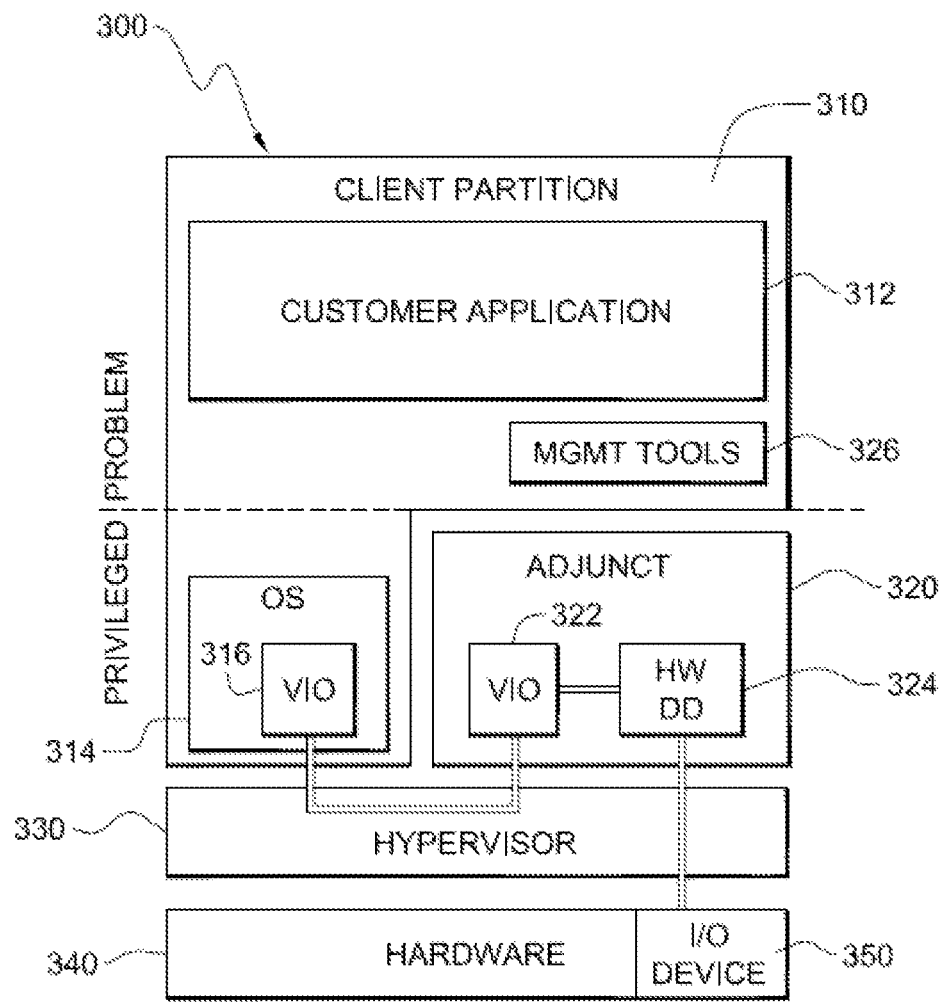
FIG. 3 illustrates one embodiment of a data processing system comprising a client logical partition and an adjunct partition, in accordance with an aspect of the present invention.

FIG. 3 illustrates one example of a data processing system 300, comprising a client logical partition (or simply client partition) 310 and an adjunct partition 320, in accordance with an aspect of the present invention. Client partition 310 is a logical partition which comprises one or more customer applications 312, an operating system instance 314 and a virtual I/O facility 316. Client partition 310 runs atop a hypervisor 330, and provides higher-level function than that provided by the hypervisor itself. Hypervisor 330 executes atop the underlying system hardware 340, which is shown to include one or more I/O devices 350.

Adjunct partition 320 is conceptually a child partition to client partition 310. The adjunct partition is less than a full logical partition, but is run in a manner whereby the hypervisor enforces security and isolation between the adjunct partition and the client partition it runs within. The adjunct partition is provided with reduced functionality compared with a full logical partition, for example, has no access to memory management unit (MMU) configuration or floating-point facilities, and is an environment that only the functionality needed to run the desired service (e.g., I/O driver) is provided. In the illustrated example, adjunct partition 320 includes a virtual I/O interface 322 and a hardware device driver service 324, which allows access to I/O device 350. In operation, client partition 310 accesses I/O device 350 via the adjunct partition 320, as illustrated. By reducing functionality within the adjunct partition environment, the run time overhead of dispatching and maintaining the adjunct partition (compared with another full logical partition) is reduced, and consequently, many of the performance disadvantages of using a separate logical partition as a virtual input output server (VIOS) are avoided.

As a specific example, the adjunct partition is described herein as running a reduced operating system environment for a device driver service. This service is provided by way of example only. The adjunct partition provides minimal, optimized, infrastructure comprising only (in one example) the structure needed by a device driver. For instance, if a Linux device driver is to run inside of the adjunct partition, then the minimal execution environment includes only the Linux kernel services or equivalent services, that the Linux device driver requires. If an AIX device driver is to run inside of the adjunct partition, then the minimal execution environment includes only the AIX kernel services, or equivalent services, that the AIX device driver requires. Advantageously, the adjunct partition runs in hypervisor/problem-state, directly against hypervisor interfaces. As explained in detail below, dispatching of the adjunct partition does not require a full partition context switch, which simplifies adjunct kernel requirements. This is achieved, in part, by mapping the adjunct partition into the client partition's virtual address page table. Client partition to adjunct partition isolation can be achieved, for example, via hypervisor-managed memory keys. Advantageously, the adjunct partition is not customer viewable. Further, the same adjunct partition service (referred to herein as a global adjunct partition service) may be instantiated within multiple client partitions, as explained below.

Various adjunct partition usage models can be implemented in accordance with the concepts disclosed herein for addressing a number of operating system and platform issues. One example is a local adjunct partition, which conceptually partially resides within an initiating client partition for accessing dedicated resources through a hypervisor. For example, a common adapter/driver service may be provided by adjunct partition for a respective dedicated adapter (i.e., resource).

As another alternative, a global adjunct partition may be used, wherein a service logical partition such as a virtual input output server partition donates memory and physical resources for instantiation of the adjunct partition. Such a global adjunct partition may be accessible or attachable by multiple client partitions, and may provide, for example, input output services to a resource via a hypervisor. As a specific example, the global adjunct partition may comprise a common adapter driver service, and the resource a shared adapter. Yet another embodiment of a global adjunct partition may rely on a hypervisor to provide resources for the adjunct. In this implementation, the hypervisor employs the adjunct partition for its own use, for example, for protection or isolation services that would otherwise exist in the hypervisor's execution domain.

In the illustrated embodiments, in order for an adjunct partition to be a runable program, the hypervisor, along with a client partition that is to use the adjunct partition service, negotiate to establish the adjunct partition environment. Once this negotiation is complete, the client partition will have donated a portion of its virtual address space to the hypervisor for use by the adjunct partition. The hypervisor will use hardware and hypervisor facilities to ensure that the client partition no longer has access to or can modify the donated resources (e.g., the donated virtual address space). The hypervisor instantiates the effective address mappings required to run the adjunct partition using the donated virtual address resources. Subsequently, the hypervisor may switch between dispatching the client partition or the adjunct partition by reprogramming its control of the donated virtual address space. When the client partition runs, it may access all virtual address space assigned to it, except for the donated virtual address range, and when the adjunct partition runs, the hypervisor disables access to all virtual addresses of the client partition, except for the donated virtual address range, that is, the virtual address space to which it is enabled. This toggling of active/inactive virtual address ranges is significantly faster than reprogramming the full memory management and address translation hardware to effect a complete context switch of the current state machine between two full logical partitions, as is necessary to switch, for example, to a virtual input/output server partition. In this manner, the adjunct partition address space is carved out of and separated from the memory management and address translation hardware resources of the client partition. The adjunct partition is thus, from a processor's perspective, part of the client partition, but from the client partition's and hypervisor's perspective, is a distinct entity.

Advantageously, the adjunct partition concepts presented herein reduce the need to use full logical partitions for providing services to client partitions. This in turn frees up resources and improves performance for customer workloads. Additionally, the adjunct partition disclosed herein encourages the development and deployment of virtual platform services in lieu of development of operating system specific services by reducing the performance penalties associated with virtualized services. This in turn allows for savings and cost development, since services may be implemented only once (i.e., in an adjunct partition), rather than natively among multiple operating systems.

Additional details regarding adjunct partitions, their configuration and use, and the various modifications that may be implemented in adjunct partitions consistent with the invention, may be found, for example, in U.S. patent application Ser. No. 12/111,020 filed Apr. 28, 2008 by Armstrong et al. (now published as U.S. P.G. Pub. No. 2009/0037941), which claims priority to U.S. Provisional Application Ser. No. 60/953,512, filed Aug. 2, 2007, each of which is incorporated by reference herein in its entirety.

Figure 4A:
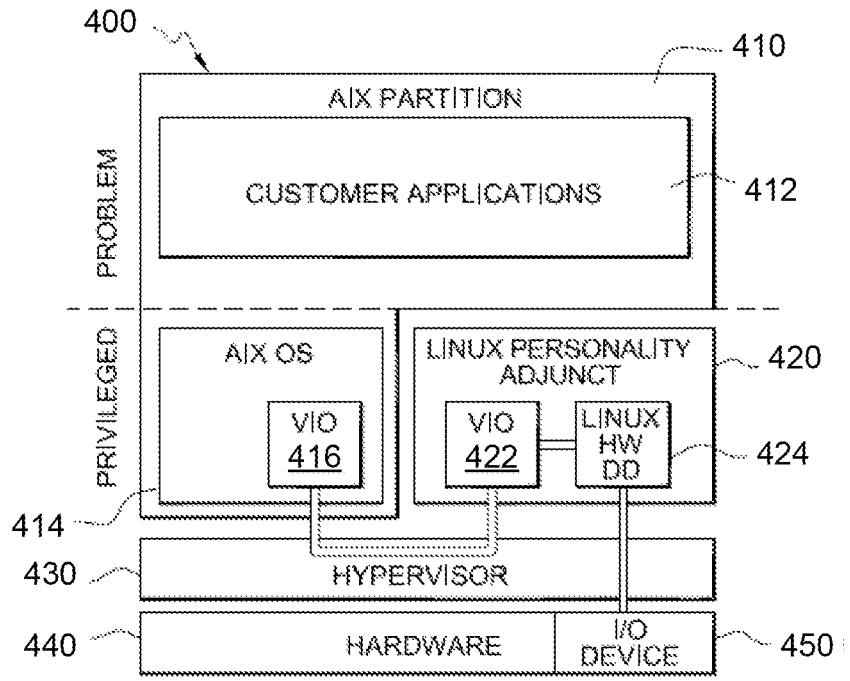
FIGS. 4A & 4B illustrate examples of an adjunct partition configuration wherein non-native operating system's device drivers are employed to access or use a physical input/output device, in accordance with an aspect of the present invention.
Figure 4B:
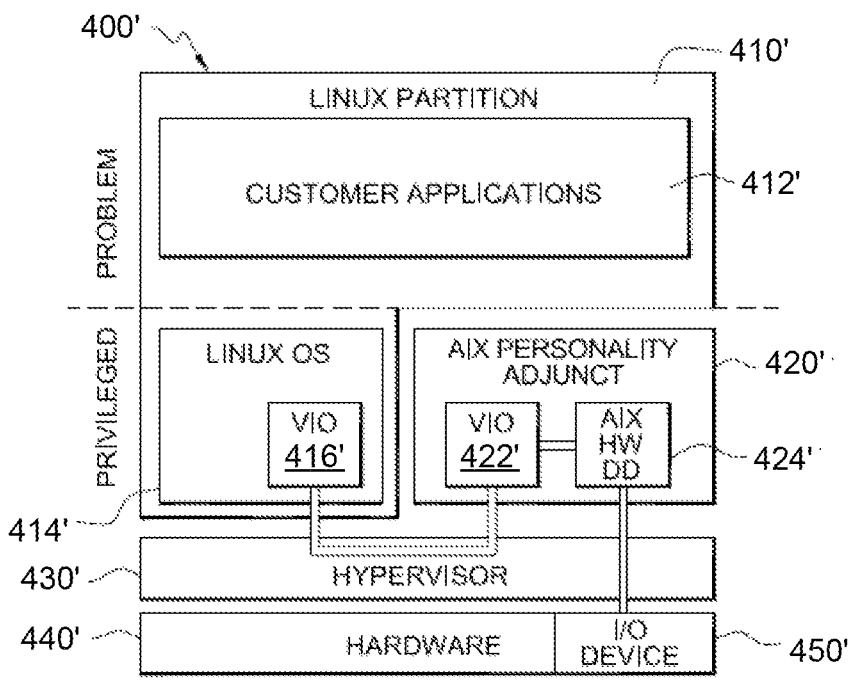

As noted above, one usage of adjunct partitions is to host device drivers, which can reduce device driver development costs by enabling device drivers to be shared between operating systems. Adjunct partitions are lightweight execution environments which operate in a separate execution state from the conventional problem and privileged states of the user applications and kernel services, respectively. This new execution state is referred to herein as the hypervisor/problem state, and is illustrated in FIGS. 4A & 4B (wherein AIX and Linux are depicted by way of example only). As explained below, instead of deploying a full VIOS partition, an operating system may instead employ an adjunct partition to support a particular, non-configurable I/O device assigned to that logical partition. In such a case, an adjunct partition is created which employs a non-native operating system's device driver as an interface to the assigned physical I/O device. Note that the native and non-native operating systems may be any two different operating systems.

FIG. 4A depicts one example of this aspect of the present invention. In this figure, a data processing system 400 is shown to comprise an AIX partition 410 and a Linux personality adjunct partition (or Linux personality adjunct) 420. AIX partition 410 is a logical partition which includes one or more customer applications 412, an AIX operating system instance 414, and a virtual I/O facility 416. AIX partition 410 runs above a hypervisor 430, and provides higher-level function than that provided by the hypervisor. Hypervisor 430 executes on top of the underlying system hardware 440, which is shown to include (one or more) I/O device 450 assigned to AIX partition 410.

Linux personality adjunct 420 is conceptually a dedicated, child partition to AIX partition 410. As described above, the adjunct partition is less than a full logical partition, but is running in a manner whereby the hypervisor enforces security and isolation between the adjunct partition and the AIX partition it runs with. The adjunct partition is provided with reduced functionality compared with a full logical partition. For example, the adjunct partition has no access to memory management unit (MMU) configuration or floating-point facilities, and is an environment wherein only the functionality needed to run the desired service (e.g., I/O driver) is provided.

In the illustrated example, the Linux personality adjunct 420 includes a virtual I/O interface 422 and a hardware device driver service 424, which allows access to I/O device 450. In this example, the hardware device driver service 424 is a Linux hardware device driver, which runs within the Linux personality adjunct 420 spawned by the AIX partition 410 in response to the AIX partition noting that it had assigned to it an I/O device 450 which was non-configurable by the AIX partition. The Linux personality adjunct 420 includes non-native kernel services sufficient to run the Linux hardware device driver for the physical I/O device. These non-native kernel services are less than a corresponding, full operating system, that is, less than a full Linux operating system in this example.

In operation, AIX partition 410 accesses I/O device 450 via the virtual I/O interface 416, 422 between the AIX operating system 414 and the Linux personality adjunct 420, which includes the Linux hardware device driver 424. By providing the non-native, Linux personality to the adjunct partition, the Linux hardware device driver is able to be run within the adjunct partition, and thereby provide access to an I/O device 450 originally assigned to AIX partition 410, notwithstanding that the I/O device is non-configurable by the AIX partition. The device becomes accessible to the AIX partition through the Linux personality adjunct 420.

FIG. 4B depicts another example of the use of an adjunct partition to provide access to a non-configurable I/O device assigned to a logical partition, which in this case is a Linux partition 410' of a data processing system 400'. The adjunct partition for this implementation is an AIX personality adjunct 420', which includes sufficient non-native, AIX kernel services within the adjunct partition to run a non-native operating system's device driver, that is, an AIX hardware device driver 424' in this example. These non-native kernel services are less than a corresponding, full operating system, that is, less than the full AIX operating system conventionally required to run the AIX hardware device driver. The Linux partition 410' is a logical partition which includes one or more customer applications 412', a Linux operating system 414', and a virtual I/O facility 416'. Linux partition 410' runs above a hypervisor 430', and provides higher-level function than that provided by the hypervisor. Hypervisor 430' executes on top of the underlying system hardware 440', which is shown to include (one or more) I/O device 450'.

AIX personality adjunct 420' is again conceptually a child partition to client partition 410'. The adjunct partition is less than a full logical partition, but is run in a manner whereby the hypervisor enforces security and isolation between the adjunct partition and the client partition it runs within, as described above. The adjunct partition is an environment wherein only the functionality needed to run the desired service (e.g., I/O driver) is provided. In this example, it is assumed that the adjunct is dedicated to the spawning logical partition, that is, Linux partition 410'.

In the illustrated example, AIX personality adjunct 420' includes a virtual I/O interface 422' and the AIX hardware device driver 424', which allows access to I/O device 450'. In operation, Linux partition 410' accesses I/O device 450' via the adjunct partition 420', as illustrated.

As used herein, a personality adjunct is an adjunct partition which has a particular operating system personality, but is less than the full operating system. In the implementation described herein, the personality adjunct is a non-native personality to the native operating system of the logical partition spawning the adjunct partition. For example, AIX partition 410 of FIG. 4A initiates creation of a Linux personality adjunct, while Linux partition 410' of FIG. 4B initiates creation of an AIX personality adjunct. These are provided by way of example only. In an alternate implementation, the personality adjunct may be a native personality to a native operating system of the logical partition spawning the adjunct partition. Further, in the non-native implementation, the personality implemented within the adjunct partition may be any non-native operating system to any native operating system of the logical partition. The personality adjunct includes a minimal service set of an operating system device driver runtime environment required by a particular device driver to run inside the adjunct. A device driver conforms to a programming environment that is defined by its host operating system environment. This programming environment typically includes a variety of kernel services for things such as memory allocation, timer services, interrupt handler registration, and invocation in response to interrupts, mapping I/O buffers for DMA (direct memory access), etc. The personality adjunct provides these services and functions in the same way that a real host operating system kernel does, such that the device driver running inside the adjunct does not know the difference between its native host operating environment and the personality adjunct described herein. This enables the unmodified device driver to be run within a lighter weight adjunct partition, in place of a full logical partition.

By way of specific example, the Linux personality adjunct 420 of FIG. 4A provides a runtime environment and kernel services which mimic the Linux device driver programming interfaces and execution environment, while the AIX personality adjunct 420' of FIG. 4B provides the runtime environment and kernel services which mimic the AIX device driver programming interfaces and execution environment of a full AIX operating system.

Multiple adjunct partitions may also be employed to provide multiple logical partitions with access to, for example, a self-virtualizing input/output device, such as a self-virtualizing input/output adapter. In a virtualized system, if a single input/output adapter is present, and that adapter is to service multiple logical partitions of the data processing system, then input/output virtualization (IOV) capabilities of the input/output device, if present, may be employed to instantiate multiple virtual functions (VF), each of which appears as an input/output adapter to a respective client logical partition. One example of a self-virtualizing input/output device is the single root input/output virtualized hardware described, for example, in "Single Root I/O Virtualization and Sharing Specification", Revision 1.0, PCI-SIG (Sep. 11, 2007), which is incorporated herein by reference in its entirety.

Adjunct partition instances may be deployed in a manner wherein each adjunct partition instance is created to support a particular logical partition to virtual function (or queue pair) pairing. Using this approach, each logical partition accesses a corresponding virtual function or queue pair employing abstract virtual input/output mechanisms. From the point of view of the client partition, this functionality is similar (or equivalent) to a VIOS implementation. However, the disadvantages of such a system are avoided since each logical partition to virtual function (or queue pair) association has a unique adjunct partition instance facilitating communication therebetween. Since each adjunct partition instance handles only a single logical partition and a single virtual function (or queue pair) it is not necessary to include locks or synchronization mechanisms otherwise needed to support multiplexing of the I/O adapter, since the system relies on the multiplexing capabilities within the self-virtualizing input/output capable device itself.

Another advantage of this adjunct partition implementation is that, since all adjunct partition instances are considered for the same device, they are able to share code and read only data, which substantially reduces the memory foot-print required to support the implementation, with the memory-foot-print cost of adding an adjunct partition instance being simply the cost associated with maintaining dynamic state information for the logical partition to virtual function (or queue pair) pairing for the new adjunct partition instance.

Further, adjunct partition instances, since they are configured to support only one logical partition to virtual function (or queue pair) pairing at a time, may be readily written in a manner to avoid many of the synchronization and locking mechanisms required by traditional I/O stacks and drivers, both in native device drivers and VIOS-based implementations. For example, adjunct partitions may be written as polling state machines, and the dedicated nature of their runtime environment precludes the need to support active preemption, thus simplifying or eliminating the need for locking.

To summarize, the use of adjunct partitions in the manner described herein permits logical partitions to obtain I/O services from input/output virtualization-capable, input/output devices or adapters in a manner that minimizes the device-driver development required for each operating system of the logical partition, since the operating systems only see virtual input/output (VIO) services (e.g., device driver services), not specific physical input/output adapter devices. This avoids the need to instantiate a logical partition to multiplex the underlying I/O hardware, and permits the multiplexing of I/O hardware to be accomplished via efficient VIO hardware capabilities, rather than software locks in a VIOS. This last aspect is a property that arises from the unique programming model of an adjunct partition, and assumes that a particular adjunct partition implementation used to support a particular I/O device makes use of these properties to create an efficient implementation.

Figure 5:
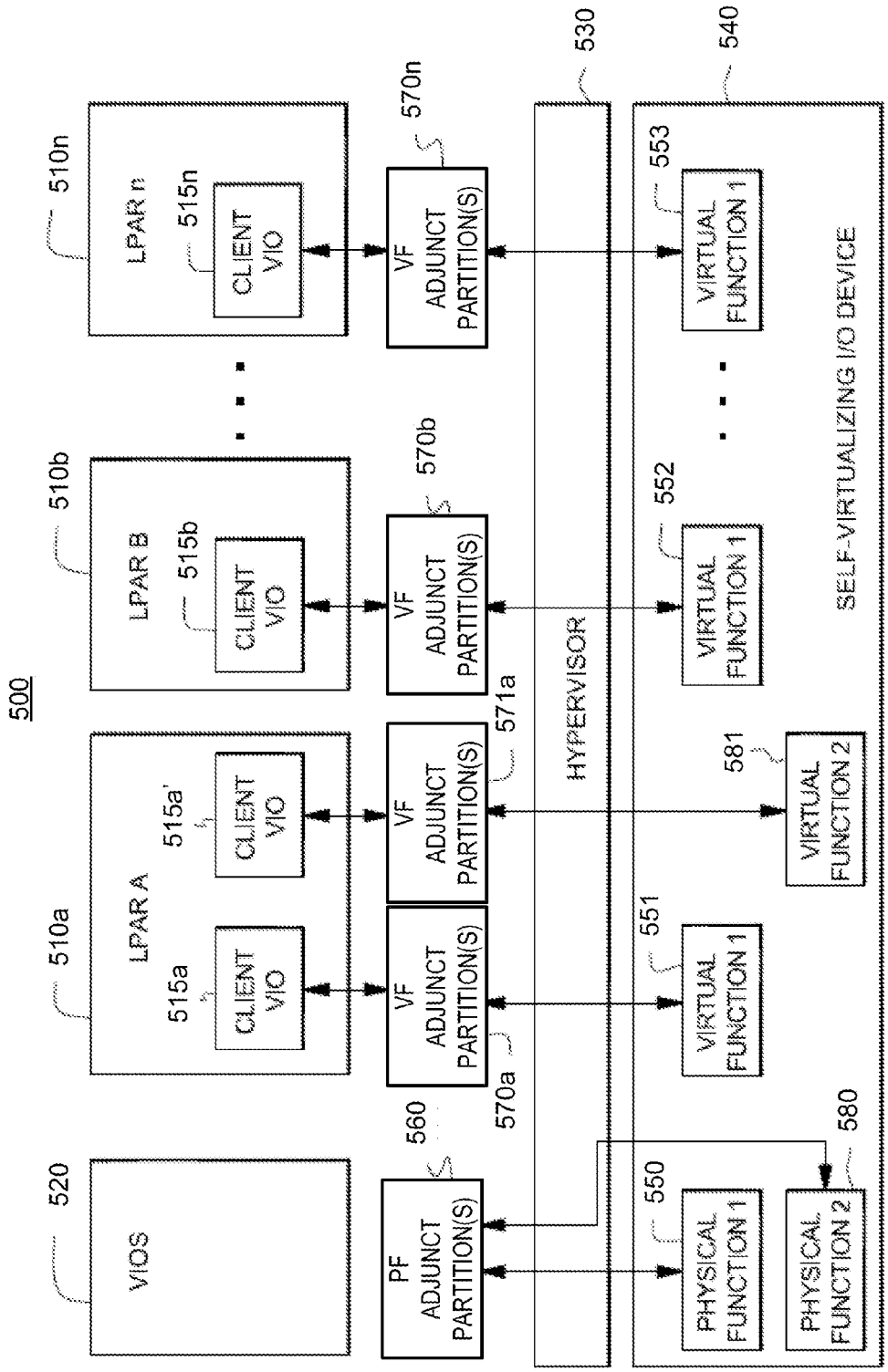
FIG. 5 illustrates one embodiment of a data processing system wherein multiple logical partitions are interfaced via device drivers within the multiple logical partitions to multiple virtual function instances of a self-virtualizing IO resource.

FIG. 5 depicts one embodiment of a data processing system, generally denoted 500, in accordance with an aspect of the present invention. Within data processing system 500, multiple logical partitions 510*a*, 510*b* . . . 510*n*, and a VIOS 520 run above a hypervisor 530, and provide higher-level function than that provided by the hypervisor. Hypervisor 530 executes on top of underlying system hardware, including a self-virtualizing input/output device (or adapter) 540. VIOS 520 is optional within the data processing system embodiment depicted. The self-virtualizing input/output device 540 is, in one embodiment, an input/output virtualization capable I/O adapter. This adapter may present multiple virtual function instances 551, 552, 553 from a first physical function 550, each of which presents the functionality associated with a normal I/O adapter. Further, in this embodiment, a second physical function 580 is depicted, from which a second virtual function 581 is provided, by way of example.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 570*a*, 571*a*, 570*b*, 570*n* are referred to as virtual function (VF) adjunct partitions due to the dedicated nature of the adjunct partitions to a particular logical partition to virtual function pairing. For all virtual functions associated with a same underlying hardware device, i.e., physical function 550 or physical function 580, the adjunct partition instances instantiated are the same. That is, each adjunct partition instance 570*a*, 570*b* . . . 570*n* is the same, while adjunct partition instantiation 571*a* is assumed to be different since it interfaces to a different virtual function 581, associated with a different physical function 580. Advantageously, by interjecting adjunct partitions between the logical partitions and the virtual functions, the input/output within each logical partition can be virtualized as a client virtual input/output (VIO) 515a, 515a', 515b . . . 515n.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification". The physical function would thus contain the SR-IOV capability structure. A virtual function is associated with the physical function, and shares one or more physical resources, such as a link, with the physical function and with other virtual functions that are associated with the same virtual function. A "function" means, in one embodiment, an addressable entity in configuration space associated with a single function number. A function may refer to one function in a multi-function device, or to the only function in a single-function device.

A physical function adjunct partition 560 is employed during initial configuration of the data processing system to facilitate setup of the virtual function adjunct partitions. Note that in the data processing system embodiment depicted in FIG. 5, multiple physical functions and multiple different virtual function instances are illustrated, two of which are accessed by a single logical partition via different virtual function adjunct partitions 570a, 571a. One, two or more than two physical functions may be implemented within the self-virtualizing input/output device, and each logical partition may access one or more of these physical functions via an associated virtual function of the device. Also, note that the client virtualized interfaces or drivers (client VIO 515a, client VIO 515a') within LPAR A 510a may be the same or different types of virtual interfaces or drivers, depending on the adjunct partition instances implemented for the particular logical partition to virtual function pairing.

The virtual function adjunct partitions 570a, 571a, 570b, 570n implement, in one embodiment, a server virtual adapter device driver, which interfaces with the respective client VIO within the associated logical partition, as well as a device driver for the virtual function on the self-virtualizing input/output device adapter. Each adjunct partition drives the respective virtual function on the adapter similar to the server virtual adapter device driver within a VIOS implementation. Creation of the adjunct partitions may be initiated by the respective logical partition, or by the hypervisor within the data processing system. Further, the advantages and characteristics of the respective adjunct partitions would be the same as described above. By way of example, each adjunct partition may implement a non-native operating system's device driver from the native operating system of the associated logical partition.

Those skilled in the art will note from the above discussion that the programming model described herein allows adjunct partition code developers to write code in a manner that allows typical operating system-kernel-code locking and synchronization primitives to be simplified or avoided. Adjunct partitions may be efficiently written as single-threaded polling state machines, and by controlling the degree of concurrency visible to a particular adjunct partition instance, it is possible to ensure that adjunct partition code may assume a runtime environment that is non-preemptive and single-threaded. For input/output processing work, there is little need for multiple threads to simultaneously execute to service a particular logical partition to virtual function pairing. These properties are feasible because each adjunct partition instance services a single logical partition to virtual function pairing in an isolated/protected environment (that is, a separate dispatchable state protected as described above), and adjunct partition instances can be deployed with overhead low enough to permit a single adjunct instance per logical partition to virtual function pairing, unlike a VIOS implementation.

Similarly, a data processing system similar to data processing system 500 may be utilized in connection with a self-virtualizing input/output device that utilizes a basic function and a queue structure virtualizable into multiple queue pairs. Each queue pair may be associated with the function, and may share one or more physical resources, such as a link, with the function and with other queue pairs that are associated with the same function. Multiple adjunct partitions may be employed to interface, for example, multiple logical partitions to respective queue pairs within the self-virtualizing input/output device, with a function adjunct partition employed during initial configuration of the data processing system to facilitate initial setup of the adjunct partitions. By providing an adjunct partition as an interface between each logical partition to queue pair pairing, a virtual input/output interface or driver can be employed within the respective logical partition. In this case, the logical partition is unaware of the actual type of hardware employed. The adjunct partition may include, for example, a server virtual device driver interfaced to a respective client VIO of the associated logical partition, as well as an appropriate physical adapter device driver for interfacing to the respective queue pair within the self-virtualizing input/output device.

Additional details regarding adjunct partitions are described in the aforementioned cross-referenced applications. In addition, various modifications to the adjunct partitions described herein will be appreciated by one of ordinary skill in the art having the benefit of the instant disclosure. Therefore, the invention is not limited to the particular adjunct partition implementations discussed herein.

Virtual Function Mapping For Migrating Logical Partition

Embodiments consistent with the invention utilize a virtual function mapping process to map virtual functions for a logical partition that is being migrated to a target system, to virtual functions associated with physical ports on the target system.

As noted above, a self-virtualizing IO resource such as an SRIOV PCI-Express adapter can be shared by different operating systems simultaneously in different logical partitions of a logically-partitioned data processing system. An SRIOV adapter typically supports one or more physical ports, and each physical port can be virtualized into multiple virtual functions (VFs). A logical partition can be assigned one or multiple virtual functions from one or multiple SRIOV adapters.

When a logical partition with SRIOV virtual functions is being migrated to another physical system, it must find compatible and free virtual functions on the target system, and each physical port of any mapped target virtual function needs to have enough capacity resource, so the target system can assign the partition the same number of virtual functions and configure them the same way as its source virtual functions.

A target virtual function is compatible when it supports the same functions as the source virtual function. As an example, if the source virtual function is of Ethernet type, a compatible target virtual function would also belong to a physical port that supports Ethernet. A target virtual function is free when it isn't currently assigned to another logical partition. A target physical port has enough capacity resource when, if the target physical port supports capacity, there is enough available capacity on the target physical port that with the additional assignment of a virtual function to the migrating logical partition, the total capacity of all virtual functions on the physical port will not exceed its full capacity. It will be appreciated in other embodiments, however, that the characteristics of a virtual function or a physical port on a target system that make them compatible with a migrating logical partition may be based upon different concerns.

Moreover, in the illustrated embodiments, it is often desirable for the physical port of a target virtual function to have the closest characteristics to the physical port of the source virtual function, e.g., whereby the physical ports have the same or similar connection speed, or the same or similar MTU (Maximum Transmission Units) setting. In some embodiments, if a matched connection speed or MTU physical port cannot be found, then a physical port with a greater connection speed or MTU setting may be preferred. In addition, in the illustrated embodiments, if two source virtual functions assigned to a logical partition are on separate SRIOV adapters, it is also often desirable that their mappings on the target system be on separate SRIOV adapters as well.

To address these concerns, a virtual function mapping process consistent with the invention desirably operates by building a candidate list of candidate physical ports for each source virtual function associated with a logical partition being migrated. A candidate physical port, in this regard, is a physical port on the target system that is capable of being mapped to a source virtual function, and in some embodiments, each candidate physical port in each candidate list is required to meet basic requirements of being of a compatible type, possessing at least one free virtual function, and having enough capacity to support the addition of the source virtual function. Each candidate physical port on each candidate list is assigned a weight based on its desired factors in relation to the source virtual function that is associated with the particular candidate list, effectively weighting the physical ports based upon their respective suitability for being mapped to that source virtual function.

It is desirable in many embodiments that after the candidate lists are created, efforts are initially directed toward the source virtual function with the smallest minimum capacity in the smallest list first. For such a list, the physical port with the highest total weight for that source virtual function is selected and a free virtual function therefor is mapped to the source virtual function. Thereafter, the weight of each physical port in each other candidate list is revalidated and recalculated, and the next candidate list is processed in a similar manner, followed by revalidation and recalculation of remaining physical ports until a target virtual function has been mapped to each source virtual function. As such, candidate physical ports are sequentially selected for the source virtual function from the candidate lists associated with such source virtual functions.

It will be appreciated that the problem of mapping source virtual functions to target virtual functions is a problem of finding the best permutation and combination of M objects out of N objects, with M being the number of source virtual functions and N being the number of target virtual functions. If N=20, M=10, the number of possible computations is as much as:

$$\frac{N!}{(N-M)!} = \frac{20!}{(20-10)!} = 670,442,572,800$$

Using the process described herein, on the other hand, if the N target virtual functions are distributed on X target physical ports, e.g., X=10, the number of calculations to build the initial candidates lists would be:

$$M \times X = 10 \times 10 = 100$$

while the number of calculations to revalidate and recalculate the total weight would be at most:

$$X \times M \times \frac{(M-1)}{2} = 10 \times 10 \times \frac{(10-1)}{2} = 450$$

which when summed results in a total number of computations of at most 550.

Figure 6:
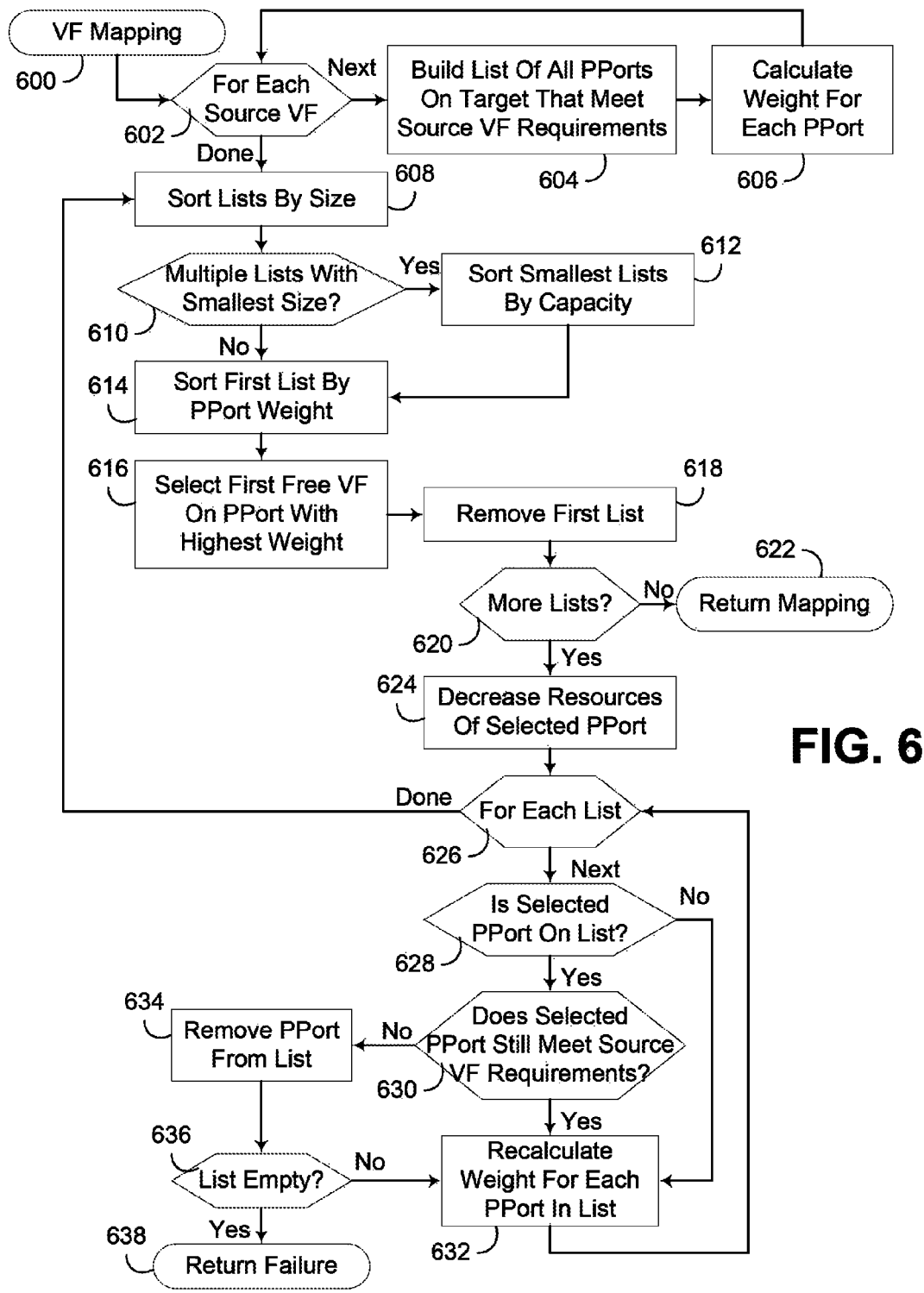
FIG. 6 illustrates an exemplary sequence of operations for a virtual function mapping routine suitable for being executed in the data processing system of FIG. 5.

FIG. 6 illustrates an exemplary implementation of a virtual function mapping routine 600 consistent with the invention. Routine 600 begins in block 602 by initiating a loop to process each virtual function assigned to the logical partition on the source system. For each such source virtual function, block 604 builds a candidate list of all candidate physical ports (PPorts) on the target system (which may be disposed in one or more self-virtualizing IO resources) that meet the source virtual function requirements. When building the list for each source virtual function, the impact to other source virtual functions is typically not considered. The requirements that a physical port may be required to meet for a source virtual function may include, for example, supporting the required type of protocol (e.g., Ethernet, FCoE, Fibre Channel, Serial Attached SCSI (SAS), etc.), providing access to the same fabric or devices (LUNs), having at least one available virtual function and sufficient capacity, etc.

In addition, block 606 calculates a weight for each physical port in the candidate list. There are several desired factors on the physical ports, which may be prioritized by assigning each desired factor a priority weight value based on its importance. The total weight for each physical port is the sum of the weight values for the factors that match with the associated source virtual function, and as such, a physical port may have different total weights in different candidate lists.

In one exemplary implementation, for example, a set of factors with the following weight values may be used:

1. If a free virtual function on this physical port is picked for this source virtual function, it will retain virtual functions' relative adapter distribution: 100

2. This physical port matches the connection speed of the source virtual function's physical port connection speed: 20

3. This physical port has greater connection speed than the source virtual function's physical port connection speed: 10

4. This physical port matches the maximum transmit unit (MTU) setting of the source virtual function's physical port MTU: 20

5. This physical port has a greater MTU setting than the source virtual function's physical port MTU: 10

6. This physical port's adapter personality matches the personality of the source virtual function's adapter: 15

It will be appreciated that other weight values may be used for the factors listed above, and moreover, other combinations of factors may be used. For example, additional types of factors that may be considered include same adapter supplier/type/model vs. just same supplier vs. different supplier, number of queues per virtual functions, offload capabilities like TCP Offload Engine (TOE) support, etc. In addition, in some embodiments a factor may be considered to match even when the factor is not met exactly, e.g., if the factor is a close fit or the closest fit among other alternatives.

Once a candidate list has been generated for each source virtual function, block 602 passes control to block 608 to sort the candidate lists by size, i.e., by the number of candidate physical ports in each candidate lists, so the source virtual functions with fewer candidates will pick their mappings first. Block 610 determines if there is more than one list with the smallest size, and if so, passes control to block 612 to sort the smallest lists by the source virtual function's minimum capacity, so the source virtual function with the smallest minimum capacity will pick its mapping first to allow every physical port to accommodate as many virtual functions as possible. If the target physical port supports capacity, but the source virtual function doesn't have a minimum capacity, then it can be assumed that the source virtual function has the default minimum capacity.

After sorting of the candidate lists, control passes to block 614 to sort the first candidate list by the physical ports' total weight, and then to block 616 to select the first free virtual function on the physical port with the highest total weight on the list as the mapped virtual function for the source virtual function. The selected mapping may then be saved in a data structure, such as a table.

Next, in block 618, the first list is removed from the set of candidate lists, and block 620 determines whether there are any more candidate lists, and thus any more source virtual functions to be mapped. If all source virtual functions have been mapped, control passes to block 622 to return the virtual function mapping and terminate routine 600.

Otherwise, control passes to block 624 to decrease the resources of the physical port to which the last virtual function was mapped. In particular, every time a target virtual function on a physical port is mapped to a source virtual function, the resources on the physical port will presumably decrease, i.e. the available virtual functions and the available capacity will decrease, so the resources for the selected physical port are adjusted accordingly.

In addition, it is typically necessary to go through the remaining candidate lists to see if this physical port is also a candidate for other source virtual functions. As such, block 626 initiates a loop to process each remaining candidate list. For each such list, block 628 determines whether the physical port is a candidate physical port for the list, and if so, block 630 determines whether the physical port still satisfies the requirements of that source virtual function.

If the physical port is not on the candidate list, or if it is, and it still meets the requirements of the source virtual function, control passes to block 632 to recalculate the weight for that physical port as well as any other candidate physical port in the list, and then return control to block 626 to process additional candidate lists. It should be appreciated that the matching factors for other candidate physical ports may change as a result of the selection of a virtual function for a physical port to map to a source virtual function. For example, after a source virtual function's mapping is determined, it may be determined that the target virtual functions on this physical port will retain the virtual function's relative adapter distribution.

Returning to block 630, if the physical port no longer meets the source virtual function's requirements, control passes to block 634 to remove the physical port from that candidate list. Then, block 636 determines if the list is empty, and assuming the list is not empty, control passes to block 632. If, however, any list becomes empty due to the removal of a physical port from the list, the routine returns with a failure condition (block 638) because the target system doesn't have enough resources to support this partition migration.

Once all candidate lists have been processed, block 626 passes control to block 608 to resort the remaining candidates by size and select a physical port from the first list after sorting. This process continues until no more candidate lists remain, and block 620 returns the final mapping.

Figure 7:
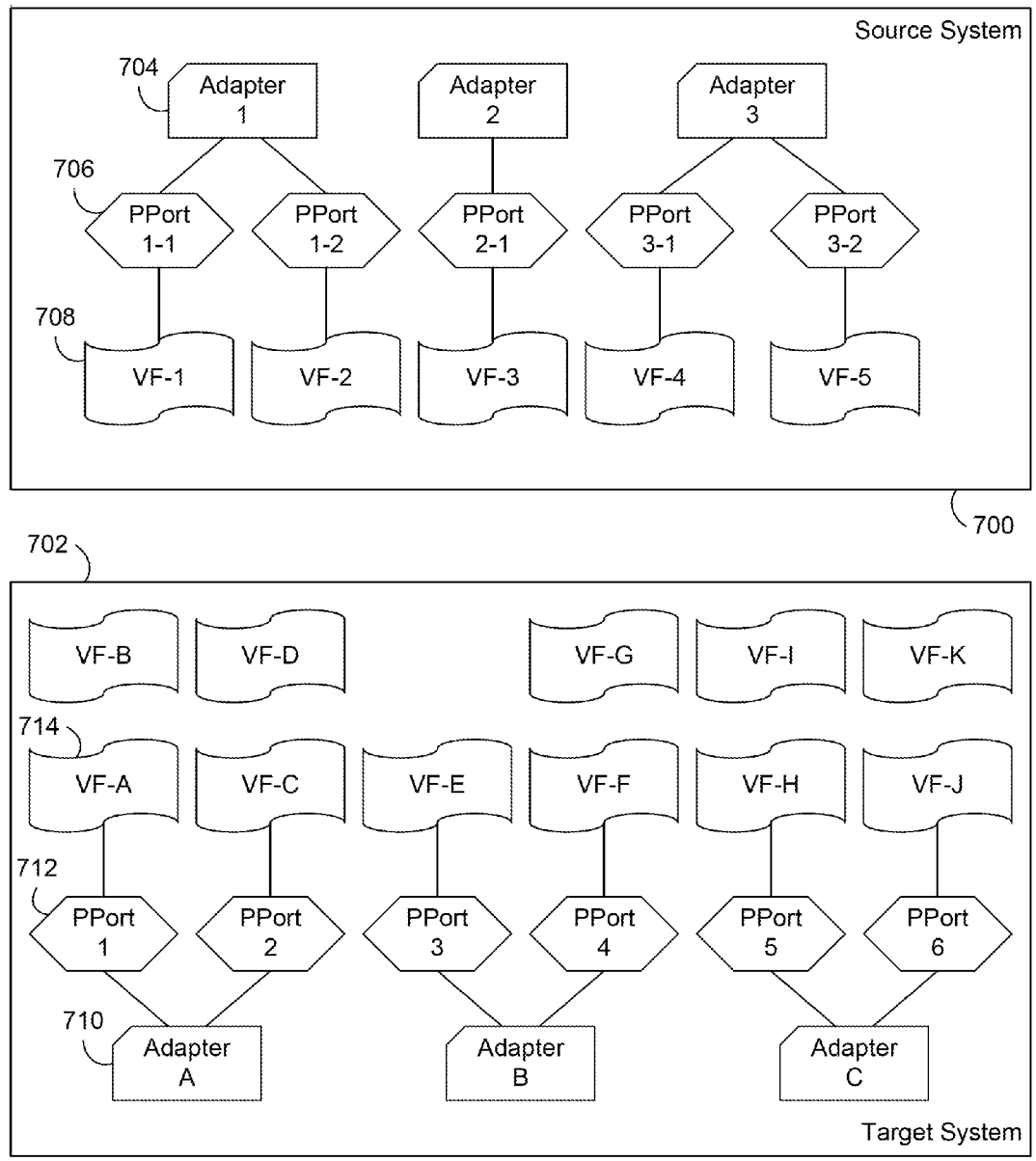
FIG. 7 illustrates initial conditions prior to mapping virtual function using the virtual mapping routine of FIG. 6 and during the migration of an exemplary logical partition from a source system to a target system.

As a further illustration of the operation of routine 600, FIG. 7 illustrates an exemplary source data processing system 700 and target data processing system 702. Source system 700 includes three SRIOV adapters 704 (also designated as adapters 1-3), with each adapter 704 including one or more physical ports 706 (also designated as PPorts 1-1 and 1-2 for adapter 1, PPort 2-1 for adapter 2 and PPorts 3-1 and 3-2 for adapter 3). For the purposes of this example, FIG. 7 illustrates the virtual functions 708 (also designated as VF-1 to VF-5) to which a logical partition to be migrated has been assigned on the source system.

Similarly, target system 702 includes a set of SRIOV adapters 710 (also designated as adapters A-C), with each adapter 710 including one or more physical ports 712 (also designated as physical ports 1-6, two of each being implemented in each adapter 710). Target system 702 also includes a set of free, currently unmapped virtual functions 714 (also designated as VF-A to VF-K) to which the source virtual functions for the migrating logical partition may potentially be mapped.

The goal of virtual function mapping in this scenario is therefore to find the best mappings between the source virtual functions VF-1 to VF-5 assigned to the migrating logical partition to target virtual functions from among virtual functions VF-A to VF-K in the target system.

Figure 8:
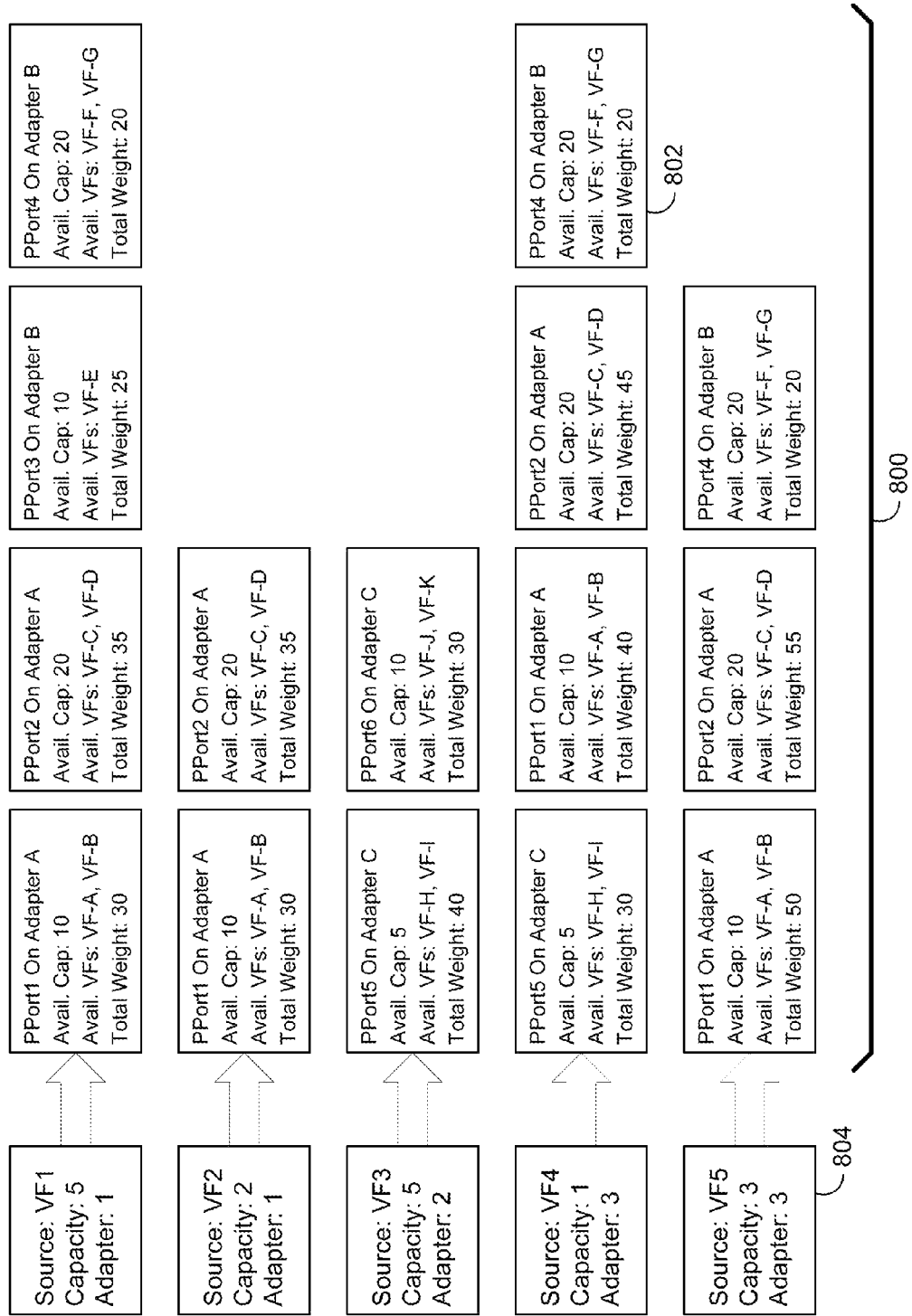
FIG. 8 illustrates an exemplary set of candidate lists generated using the virtual mapping routine of FIG. 6.

Now turning to FIG. 8, this figure illustrates an initial set of candidate lists 800, generated, for example, in blocks 602-606 of routine 600 (FIG. 6). Each list 800 includes a set of candidate physical ports 802 and associated with a particular source virtual function 804. For each source virtual function 804, a capacity and a host adapter is illustrated, while each candidate physical port 802 includes an available capacity, a list of available virtual functions, and a total weight relative to the source virtual function as calculated in block 606. The weight is calculated based upon the exemplary factors and factor weights discussed above.

Figure 9:
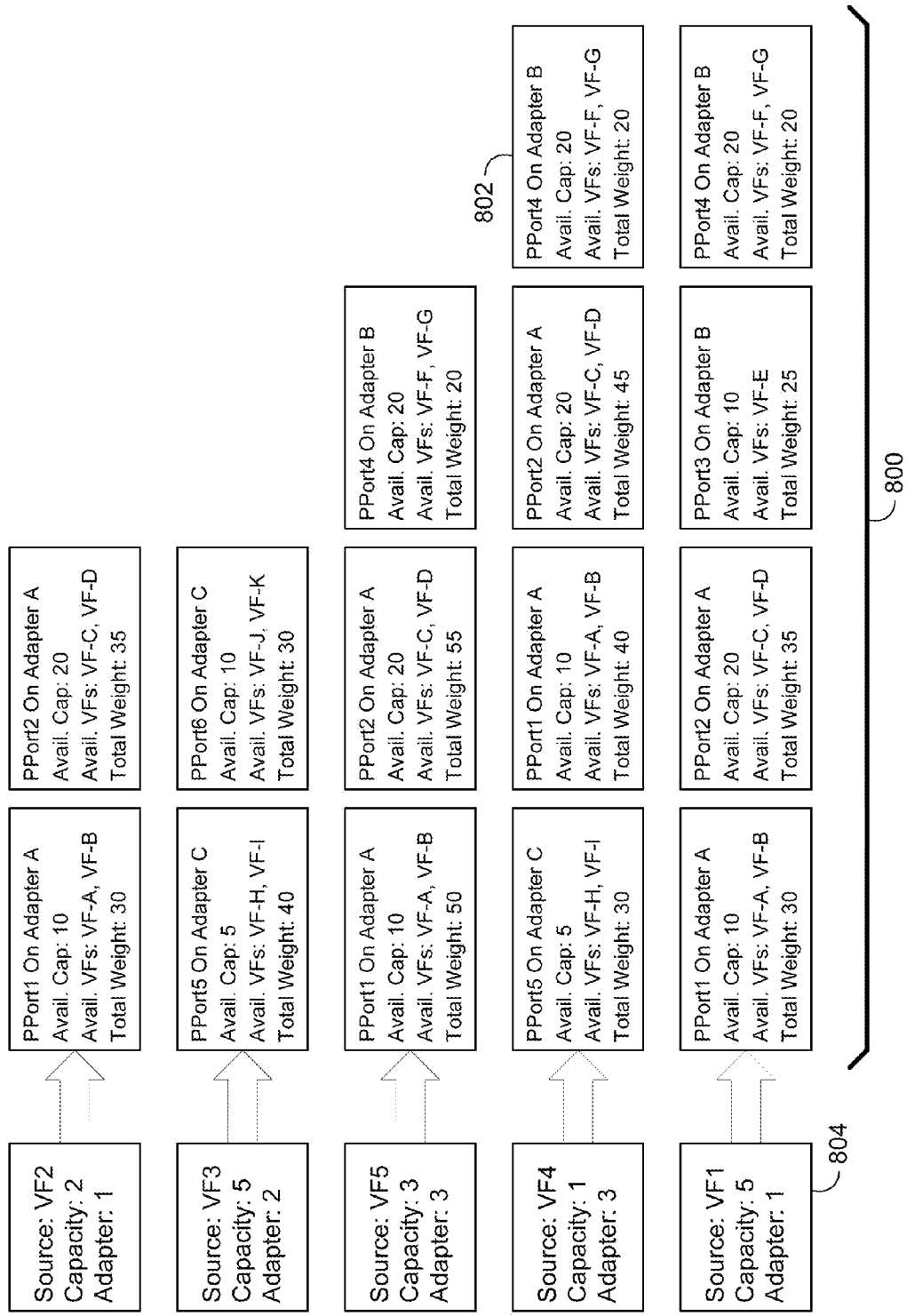
FIG. 9 illustrates the set of candidate lists of FIG. 8 after sorting by the virtual mapping routine of FIG. 6.

FIG. 9 next illustrates the sorting of the initial set of candidate lists 800, as performed, for example, using blocks 608-612 of routine 600. Note that source virtual functions VF2 and VF3 are the smallest sized, but source virtual function VF2 is sorted above source virtual function VF3 based upon a smaller minimum capacity.

Figure 10:
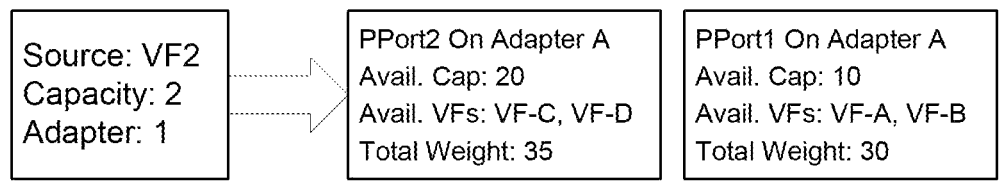
FIG. 10 illustrates sorting of the first list in the set of candidate lists of FIG. 9 using the virtual mapping routine of FIG. 6.

Next, as shown in FIG. 10, the first candidate list is sorted by physical port total weight, and the first free virtual function on the physical port with the highest weight is selected, for example, using blocks 614-616 (FIG. 6). As such, virtual function VF-C on PPort2 is selected to map to source virtual function VF2.

Figure 11:
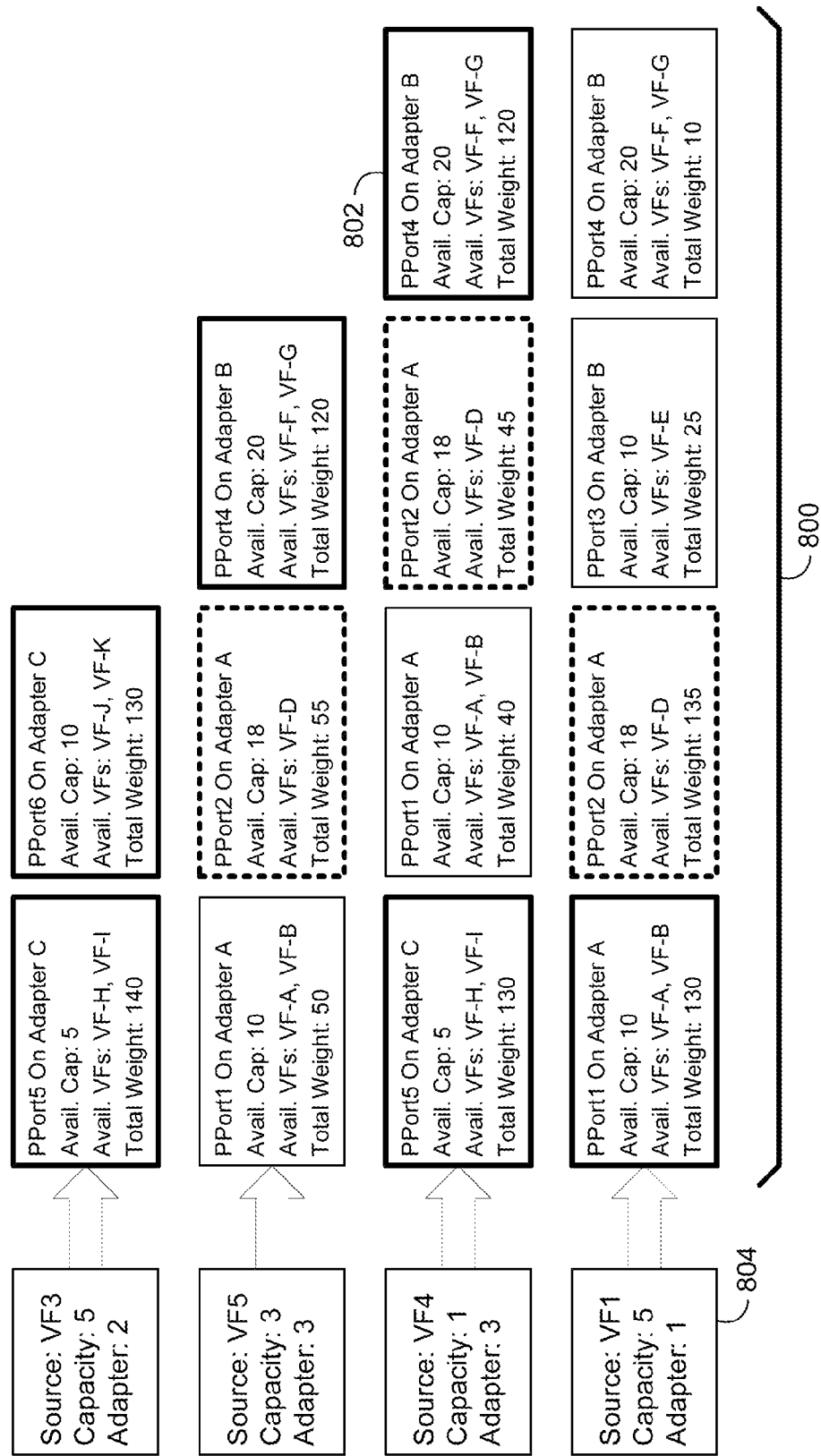
FIG. 11 illustrates the set of candidate lists of FIG. 8 after removing the first list and recalculating weights with the virtual mapping routine of FIG. 6.

As noted above, every time a target virtual function is mapped to a source virtual function, the resources on the target physical port, e.g., the available capacity and the available virtual functions, will presumably decrease, necessitating that the remaining lists be analyzed to determine if the physical port still satisfies the requirements of the associated source virtual functions after the presumable resource decrease. FIG. 11 illustrates the result of such analysis after mapping source virtual function VF2, using blocks 618-638 of routine 600 (FIG. 6).

In particular, the candidate list for source virtual function VF2 has been removed. In addition, as illustrated by the blocks in dashed lines, PPort2 has decreased its capacity by source virtual function VF2's capacity of 2, and target virtual function VF-C has been removed from its available virtual function list. In addition, as illustrated by the blocks in bolded lines, the total weights of other physical ports have changed because after source virtual function VF2's mapping is determined, one can tell if the target virtual functions on this physical port will retain the virtual function's relative adapter distribution if picked.

Figure 12:
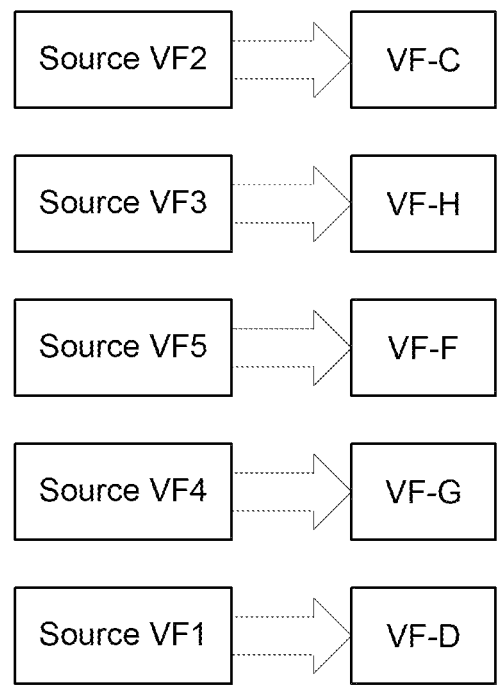
FIG. 12 illustrates a final virtual function mapping generated for the exemplary logical partition of FIG. 7 using the virtual mapping routine of FIG. 6.
Figure 13:
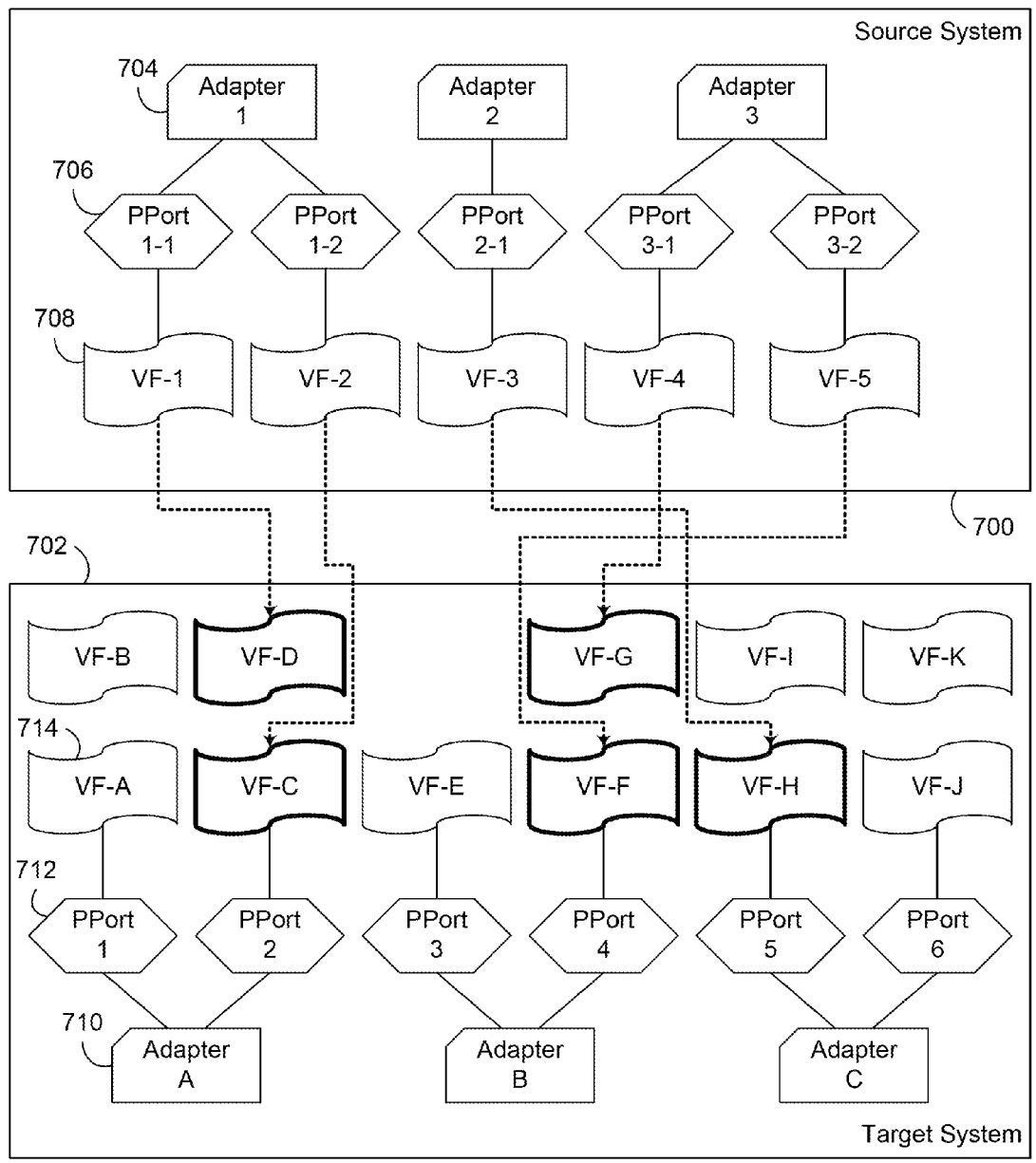
FIG. 13 illustrates the final virtual function mapping generated for the exemplary logical partition of FIG. 7.

Selection thereafter continues, with source virtual functions VF3, VF5, VF4 and VF1 sequentially mapped to VF-H, VF-F, VF-G and VF-D, respectively. The resulting mapping is illustrated further in FIGS. 12 and 13.

It will be appreciated that because of the use of the priority weights, and the sortings by candidate sizes, source virtual function minimum capacity, and physical port total weight, the herein-described algorithm allocates a best fit for the source virtual functions easily and quickly. The algorithm is adaptable to implementation in practically any computer language, and implementation of same would be well within the abilities of one of ordinary skill in the art having the benefit of the instant disclosure. Moreover, it will be appreciated that the algorithm may be performed on the source system, on the target system, or on a completely different data processing system. The invention is therefore not limited to the particular implementation discussed herein.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of mapping source virtual functions for a logical partition in a first logically partitioned data processing system in association with migrating the logical partition to a second logically partitioned data processing system, the method, executed by at least one processor, comprising:
   for each of the source virtual functions assigned to the logical partition on the first logically partitioned data processing system, building an associated candidate list for each of the source virtual functions, each candidate list identifying at least one candidate physical port associated with at least one target virtual function in the second logically partitioned data processing system, wherein the identified at least one candidate physical port is capable of being mapped to the source virtual function associated with the candidate list via the at least one target virtual function of the identified at least one candidate physical port;
   calculating, for each candidate physical port in each candidate list, a weight based upon suitability of such candidate physical port for mapping to the source virtual function associated with the candidate list;
   sequentially selecting a candidate physical port, based on the candidate physical port's calculated weight, for each of the source virtual functions from the candidate list associated with the source virtual function, wherein sequentially selecting includes, after selecting a candidate physical port from the candidate list for a source virtual function and before selecting a next candidate physical port from a candidate list for another source virtual function, recalculating the weight for candidate physical ports in each of the other candidate lists of any source virtual function for which a candidate physical port has not yet been selected.

2. The method of claim 1, wherein sequentially selecting a candidate physical port for each of the source virtual functions from the candidate list associated with the source virtual function further includes, after selecting a candidate physical port from the candidate list for a source virtual function, removing a candidate physical port in the candidate list associated with any source virtual function for which a candidate physical port has not been selected if such candidate physical port is no longer capable of being mapped to the source virtual function associated with the candidate list after the selection.

3. The method of claim 1, wherein building the associated candidate list for a first source virtual function among the source virtual functions includes adding a first candidate physical port to the associated candidate list for the first source virtual function if the first candidate physical port is a compatible type with the first source virtual function and has at least one free target virtual function capable of being assigned to the first source virtual function.

4. The method of claim 3, wherein adding the first candidate physical port to the associated candidate list for the first source virtual function is performed only if the first candidate physical port has sufficient available capacity to support the first source virtual function if the free target virtual function is assigned to the first source virtual function.

5. The method of claim 1, wherein calculating a weight for a first candidate physical port in a first candidate list associated with a first source virtual function includes summing a plurality of weight values associated with a plurality of factors that match between the first source virtual function and the first candidate physical port.

6. The method of claim 5, wherein each of the plurality of factors is selected from the group consisting of matching connection speed between the first candidate physical port and the first source virtual function, greater connection of the first candidate physical port than the first source virtual function, matching maximum transmit unit (MTU) between the first candidate physical port and the first source virtual function, greater MTU of the first candidate physical port than the first source virtual function, selection of free target virtual function on first candidate physical port would retain first source virtual function's relative self-virtualizing IO resource distribution, and personality of a first self-virtualizing IO resource for the first candidate physical port matches a personality of a second self-virtualizing IO resource on the first logically partitioned data processing system to which the first source virtual function is assigned.

7. The method of claim 5, wherein sequentially selecting a candidate physical port for each of the source virtual functions from the candidate list associated with the source virtual function further includes sorting the plurality of candidate lists based upon a size of each candidate list such that candidate physical ports are selected from candidate lists with fewer candidate physical ports before candidate physical ports are selected from candidate lists with more candidate physical ports.

8. The method of claim 7, wherein sorting the plurality of candidate lists further includes sorting candidate lists having the same size based upon minimum capacities of associated source virtual functions such that candidate physical ports are selected from candidate lists for source virtual functions with smaller minimum capacities before candidate physical ports are selected from candidate lists for source virtual functions with larger minimum capacities.

9. The method of claim 5, wherein selecting a candidate physical port for the first source virtual function from the first candidate list includes assigning to the first source virtual function a free target virtual function associated with a candidate physical port having a highest weight in the first candidate list.

10. The method of claim 9, wherein sequentially selecting a candidate physical port for each of the source virtual functions from the candidate list associated with the source virtual function further includes removing the first candidate list after assigning the free target virtual function to the first source virtual function.

11. The method of claim 9, wherein recalculating the weight for candidate physical ports in the candidate list associated with any source virtual function for which a candidate physical port has not been selected includes recalculating the weight to account for assignment of the free target virtual function to the first source virtual function.

12. An apparatus, comprising:
at least one processor; and
program code configured to be executed by the at least one processor to map source virtual functions for a logical partition in a first logically partitioned data processing system in association with migrating the logical partition to a second logically partitioned data processing system by:
for each of the source virtual functions assigned to the logical partition on the first logically partitioned data processing system, building an associated candidate list for each of the source virtual functions, each candidate list identifying at least one candidate physical port associated with at least one target virtual function in the second logically partitioned data processing system, wherein the identified at least one candidate physical port is capable of being mapped to the source virtual function associated with the candidate list via the at least one target virtual function of the identified at least one candidate physical port;
calculating, for each candidate physical port in each candidate list, a weight based upon suitability of such candidate physical port for mapping to the source virtual function associated with the candidate list;
sequentially selecting a candidate physical port, based on the candidate physical port's calculated weight, for each of the source virtual functions from the candidate list associated with the source virtual function, wherein sequentially selecting includes, after selecting a candidate physical port from the candidate list for a source virtual function and before selecting a next candidate physical port from a candidate list for another source virtual function, recalculating the weight for candidate physical ports in each of the other candidate lists of any source virtual function for which a candidate physical port has not yet been selected.

13. The apparatus of claim 12, wherein the program code is configured to sequentially select a candidate physical port for each of the source virtual functions from the candidate list associated with the source virtual function further by, after selecting a candidate physical port from the candidate list for a source virtual function, removing a candidate physical port in the candidate list associated with any source virtual function for which a candidate physical port has not been selected if such candidate physical port is no longer capable of being mapped to the source virtual function associated with the candidate list after the selection.

14. The apparatus of claim 12, wherein the program code is configured to build the associated candidate list for a first source virtual function among the source virtual functions by adding a first candidate physical port to the associated candidate list for the first source virtual function if the first candidate physical port is a compatible type with the first source virtual function and has at least one free target virtual function capable of being assigned to the first source virtual function.

15. The apparatus of claim 14, wherein the program code is configured to add the first candidate physical port to the associated candidate list for the first source virtual function only if the first candidate physical port has sufficient available capacity to support the first source virtual function if the free target virtual function is assigned to the first source virtual function.

16. The apparatus of claim 12, wherein the program code is configured to calculate a weight for a first candidate physical port in a first candidate list associated with a first source virtual function by summing a plurality of weight values associated with a plurality of factors that match between the first source virtual function and the first candidate physical port.

17. The apparatus of claim 16, wherein each of the plurality of factors is selected from the group consisting of matching connection speed between the first candidate physical port and the first source virtual function, greater connection of the first candidate physical port than the first source virtual function, matching maximum transmit unit (MTU) between the first candidate physical port and the first source virtual function, greater MTU of the first candidate physical port than the first source virtual function, selection of free target virtual function on first candidate physical port would retain first source virtual function's relative self-virtualizing IO resource distribution, and personality of a first self-virtualizing IO resource for the first candidate physical port matches a personality of a second self-virtualizing IO resource on the first logically partitioned data processing system to which the first source virtual function is assigned.

18. The apparatus of claim 16, wherein the program code is configured to sequentially select a candidate physical port for each of the source virtual functions from the candidate list associated with the source virtual function further by sorting the plurality of candidate lists based upon a size of each candidate list such that candidate physical ports are selected from candidate lists with fewer candidate physical ports before candidate physical ports are selected from candidate lists with more candidate physical ports.

19. The apparatus of claim 18, wherein the program code is configured to sort the plurality of candidate lists further by sorting candidate lists having the same size based upon minimum capacities of associated source virtual functions such that candidate physical ports are selected from candidate lists for source virtual functions with smaller minimum capacities before candidate physical ports are selected from candidate lists for source virtual functions with larger minimum capacities.

20. The apparatus of claim 16, wherein the program code is configured to select a candidate physical port for the first source virtual function from the first candidate list by assigning to the first source virtual function a free target virtual function associated with a candidate physical port having a highest weight in the first candidate list.

21. The apparatus of claim 20, wherein the program code is configured to sequentially select a candidate physical port for each of the source virtual functions from the candidate list associated with the source virtual function further by removing the first candidate list after assigning the free target virtual function to the first source virtual function.

22. The apparatus of claim 20, wherein the program code is configured to recalculate the weight for candidate physical ports in the candidate list associated with any source virtual function for which a candidate physical port has not been selected by recalculating the weight to account for assignment of the free target virtual function to the first source virtual function.

23. A program product, comprising:
- a computer readable memory; and
- program code stored on the computer readable memory and configured upon execution to map source virtual functions for a logical partition in a first logically partitioned data processing system in association with migrating the logical partition to a second logically partitioned data processing system by:
  - for each of the source virtual functions assigned to the logical partition on the first logically partitioned data processing system, building an associated candidate list for each of the source virtual functions, each candidate list identifying at least one candidate physical port associated with at least one target virtual function in the second logically partitioned data processing system, wherein the identified at least one candidate physical port is capable of being mapped to the source virtual function associated with the candidate list via the at least one target virtual function of the identified at least one candidate physical port;
  - calculating, for each candidate physical port in each candidate list, a weight based upon suitability of such candidate physical port for mapping to the source virtual function associated with the candidate list;
  - sequentially selecting a candidate physical port, based on the candidate physical port's calculated weight, for each of the source virtual functions from the candidate list associated with the source virtual function, wherein sequentially selecting includes, after selecting a candidate physical port from the candidate list for a source virtual function and before selecting a next candidate physical port from a candidate list for another source virtual function, recalculating the weight for candidate physical ports in each of the other candidate lists of any source virtual function for which a candidate physical port has not yet been selected.

\* \* \* \* \*